(12) United States Patent
Liensberger et al.

(10) Patent No.: US 10,949,048 B2
(45) Date of Patent: Mar. 16, 2021

(54) INFERENCE-BASED VISUAL MAP OF ORGANIZATIONAL STRUCTURE AND RESOURCE USAGE

(71) Applicant: Microsoft Technology Licensing, LLC, Redmond, WA (US)

(72) Inventors: Christian Liensberger, Bellevue, WA (US); James Eldon Tillinghast, Seattle, WA (US); Mark Wade Heninger, Preston, WA (US); Christina Storm, Seattle, WA (US); Chairy Chiu Ying Cheung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 807 days.

(21) Appl. No.: 14/793,910

(22) Filed: Jul. 8, 2015

(65) Prior Publication Data

US 2017/0010756 A1 Jan. 12, 2017

(51) Int. Cl.
*G06F 3/00* (2006.01)
*G06F 3/0481* (2013.01)
(Continued)

(52) U.S. Cl.
CPC ........ *G06F 3/0481* (2013.01); *G06F 3/04817* (2013.01); *G06F 21/552* (2013.01); *H04L 41/14* (2013.01); *H04L 41/22* (2013.01)

(58) Field of Classification Search
CPC .............. G06F 3/0481; G06F 3/04817; G06F 17/30873; G06F 21/552; H04L 41/14; H04L 41/22
See application file for complete search history.

(56) References Cited

U.S. PATENT DOCUMENTS 6,671,830 B2 12/2003 Kaler et al.
7,310,774 B1 * 12/2007 Arquie .................... H04L 41/12
715/734
(Continued)

OTHER PUBLICATIONS

"VMware vCenter Operations Manager Getting Started Guide", Published on: Apr. 29, 2013, pp. 118 Available at: http://www.vmware.com/pdf/vcops-57-getting-started-guide.pdf.
(Continued)

*Primary Examiner* — William L Bashore
*Assistant Examiner* — David Faber
(74) *Attorney, Agent, or Firm* — Fiala & Weaver P.L.L.C.

(57) ABSTRACT

Organizations may comprise a variety of resources that are assigned to various organizational units, and allocated for various projects or tasks. A user who wishes to understand the organizational structure of the resources may examine information sources, such as resource manifests and resource access logs, and interpret such information with the user's knowledge of the organization, but may fail to achieve a comprehensive, accurate, and up-to-date understanding of the organization. Instead, interactions among users and resources may be monitored to infer organizational structure; assignment of resources to organizational units; relationships among resources; and usages arising within such resource relationships. Based on such inferences, an interactive visual map may be automatically generated that depicts the arrangement of the organization and the interrelationships of the resources. A user may interact with the visualized resources, such as changing the time range or level of detail, or selecting resources to view usage information.

18 Claims, 13 Drawing Sheets

(51) Int. Cl.
*G06F 21/55* (2013.01)
*H04L 12/24* (2006.01)

(56) References Cited

U.S. PATENT DOCUMENTS

| | | | | |
|---|---|---|---|---|
| 7,430,593 | B2* | 9/2008 | Baldwin | H04L 67/1097 709/223 |
| 7,509,405 | B2* | 3/2009 | Hubbard | H04L 29/06 709/223 |
| 7,681,130 | B1* | 3/2010 | Lavallee | H04L 41/22 715/735 |
| 7,702,718 | B2 | 4/2010 | Batra et al. | |
| 7,933,981 | B1* | 4/2011 | Cannon, III | H04L 41/12 709/220 |
| 7,975,043 | B2* | 7/2011 | Douglas | H04L 29/06 709/224 |
| 8,631,021 | B2* | 1/2014 | Palmer | G06Q 10/10 707/754 |
| 9,557,879 | B1* | 1/2017 | Wang | H04L 41/12 |
| 9,832,221 | B1* | 11/2017 | Newstadt | H04L 63/145 |
| 10,333,820 | B1* | 6/2019 | Wang | H04L 41/12 |
| 2002/0038371 | A1* | 3/2002 | Spacey | H04L 67/42 709/227 |
| 2002/0135610 | A1* | 9/2002 | Ootani | G06F 3/0481 715/734 |
| 2005/0091482 | A1* | 4/2005 | Gray | H04L 41/5058 713/151 |
| 2005/0216942 | A1* | 9/2005 | Barton | H04N 21/43632 725/97 |
| 2006/0075335 | A1* | 4/2006 | Gloor | G06T 11/206 715/273 |
| 2007/0143842 | A1 | 6/2007 | Turner et al. | |
| 2007/0203872 | A1* | 8/2007 | Flinn | G06N 7/02 706/62 |
| 2007/0276775 | A1* | 11/2007 | Gloor | H04L 43/045 706/13 |
| 2009/0199108 | A1* | 8/2009 | Bannister | G06Q 10/00 715/747 |
| 2009/0235174 | A1* | 9/2009 | Royt | H04L 67/16 715/735 |
| 2010/0153377 | A1 | 6/2010 | Rajan et al. | |
| 2010/0185630 | A1* | 7/2010 | Cheng | H04L 51/32 707/756 |
| 2011/0061013 | A1 | 3/2011 | Bilicki et al. | |
| 2011/0261055 | A1 | 10/2011 | Wong et al. | |
| 2012/0296624 | A1 | 11/2012 | Jeng et al. | |
| 2012/0311475 | A1 | 12/2012 | Wong | |
| 2013/0182577 | A1 | 7/2013 | Ivanyi et al. | |
| 2014/0365647 | A1* | 12/2014 | Haraszti | H04L 43/045 709/224 |
| 2015/0127178 | A1* | 5/2015 | Forbes, Jr. | G05B 19/02 700/286 |
| 2016/0034842 | A1* | 2/2016 | Harthcryde | G06Q 10/067 705/7.14 |
| 2017/0010756 | A1* | 1/2017 | Liensberger | G06Q 10/10 |

OTHER PUBLICATIONS

"VMware vCenter Operations Enterprise User's Guide", 2011, pp. 120 Available at: http://www.vmware.com/pdf/vcops-enterprise10-users-guide.pdf.

"Monitoring Business Critical Applications with VMware vCenter™ Operations Manager™", Published on: Jan. 22, 2014, pp. 92 Available at: http://www.vmware.com/files/pdf/solutions/Monitoring-Business-Critical-Applications-VMware-vCenter-Operations-Manager-white-paper.pdf.

"International Preliminary Report on Patentability Issued in PCT Application No. PCT/US2016/041218", dated Mar. 15, 2017, 7 Pages.

"Second Written Opinion Issued in PCT Application No. PCT/US2016/041218", dated Dec. 5, 2016, 5 Pages.

"International Search Report and Written Opinion Issued in PCT Application No. PCT/US2016/041218", dated Sep. 22, 2016, 12 Pages.

Erbacher, et al., "Glyph-Based Generic Network Visualization", In Proceedings of the SPIE, Visualization and Data Analysis, vol. 4665, Mar. 11, 2002, 10 Pages.

Liao, et al., "ENAVis: Enterprise Network Activities Visualization", In Proceedings of the 22nd Conference on Large Installation System Administration (LISA), pp. 59-74.

* cited by examiner

INFERENCE-BASED VISUAL MAP OF ORGANIZATIONAL STRUCTURE AND RESOURCE USAGE

BACKGROUND

Within the field of computing, many scenarios involve a presentation of a set of resources of an organization, such as a manifest of servers that communicate over an organization network. The manifest of servers enables a user to review the number, arrangement, and composition of the resources, as well as details of each resource, such as its role and the context of its use. The manifest may be generated by a user (e.g., by preparing a detailed database of relevant information about each resource) or by automated techniques (e.g., by performing a network scan and storing the details reported by each device, such as its IP address, hardware and software configuration, and capabilities such as available storage and bandwidth). Further information may be determined, e.g., based upon a resource access log that indicates interactions between resources of the organization. A user may then review the resource manifest and the resource access log, in the context of the user's understanding of the organization (e.g., its hierarchical structure, the organizational units, personnel, and projects that may own, manage, utilize, or otherwise have an association with each resource), and may therefore achieve a greater understanding of the pairing of the resources with the structure and activities of the organization.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While a user may be able to interpret the entries of a resource manifest according to the user's understanding of the organization, such interpretation depends upon the depth and accuracy of the user's knowledge of the organization. As a first example, the user may associate a first resource with a particular organizational unit, but such association may not convey a complete understanding of the resource (e.g., the first resource may be owned or maintained by the organizational unit, but may be primarily utilized by a different organizational unit), and/or may not be accurate if the structure of the organization or the allocation of resources changes (e.g., a server that was previously owned by the organizational unit may have been reassigned to a different organizational unit). As a second example, the user may not be aware of relationships among resources (e.g., a first database server may import information from a second database server), and may therefore have an incorrect cognitive understanding of the arrangement of the resources, particularly for a large, diverse, and potentially sprawling organization with a high number of organizational units, resources, and activities. As a third example, the user may understand that two resources are interrelated (e.g., that a first database server shares data with a second database server), but may not fully understand the usage of the relationship (e.g., the organizational units, projects, or activities that the relationship serves; the role of each database server in the relationship; the types and volume of data are shared; and/or the storage and network capacity involved in the sharing). It may be possible for a first user to prepare a comprehensive map or annotated manifest of the resources that includes up-to-date allocations to organization units and/or relationships with other resources, but the accuracy of a human-mediated manifest may exhibit diminished accuracy and currency, and may entail an inefficient use of human resources.

Presented herein are techniques for automatically generating an interactive visual map of the resources of an organization. Notably, rather than depending upon human-initiated efforts to specify and maintain the structural and relational information, the techniques presented herein utilize inferences based on various information sources to determine the structure of the organization; the allocation of resources to organizational units; the relationships among various resources; and the usage arising within each such relationship. Such inferences may be achieved, e.g., based upon information such as which users of the organization interact with each resource; heuristic indicators of the interactions that are characteristic of a particular type of organizational unit; and monitoring the details of interactions among resources, such as network communication patterns. Inferences of the organizational units to which the resources are allocated, the interrelationships of resources, and the usages arising within such relationships may enable an automated generation of a visual map of the resources of the organization, wherein the resources may be visually clustered according to the organizational unit. The visual map may also depict relationships and usages, and may allow the user to navigate through the visual map and to view the properties of a particular resource, relationship, and/or usage.

A first example embodiment of the techniques presented herein involves a device that presents to a user a visual map of resources of an organization having an organizational structure, wherein the device comprises a processor, a display, and a memory. The memory stores instructions that, when executed on the processor, provide a system comprising a resource usage evaluator that monitors an interaction between respective resources of the organization to infer, from the interaction, an organizational unit to which the resource is assigned; a relationship between the resource and a related resource of the organization; and at least one usage of the resource associated with the relationship. The system also comprises an organization map presenter, which presents a visual map of the resources of the organization on the display of the device, and presents a description of the usage of selected resources within the organization.

A second example embodiment of the techniques presented herein involves a method of presenting an interactive visual map of resources of an organization having an organizational structure to a user of a device having a processor and a display. The method involves executing, on the processor, instructions that cause the device to monitor an interaction between respective resources of the organization to infer, from the interaction, an organizational unit to which the resource is assigned; a relationship between the resource and a related resource of the organization; and at least one usage of the resource associated with the relationship. Executing the instructions also causes the device to present, on the display, a visual map of the resources of the organization, and a description of the usage of a selected resource within the organization.

A third example method of the techniques presented herein involves a method of enabling a user to interact with resources of an organization having an organizational structure. The method involving a device having a display and a processor, and comprises executing, on the processor, instructions that cause the device to detect an interaction between respective resources of the organization. Executing the instructions also causes the device to determine, from the interaction, an organizational unit to which the resource is assigned; a relationship between the resource and a related resource of the organization; and at least one usage of the resource associated with the relationship. Executing the instructions also causes the device to present to the user, on the display, a visual map of the resources of the organization; and, responsive to receiving from the user a selection of a selected resource in the visual map, a description of the usage of the selected resource within the organization. These and other embodiments may be utilized to present a visual map of the resources of an organization based upon inferences of the organizational structure and resource relationships and usages in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
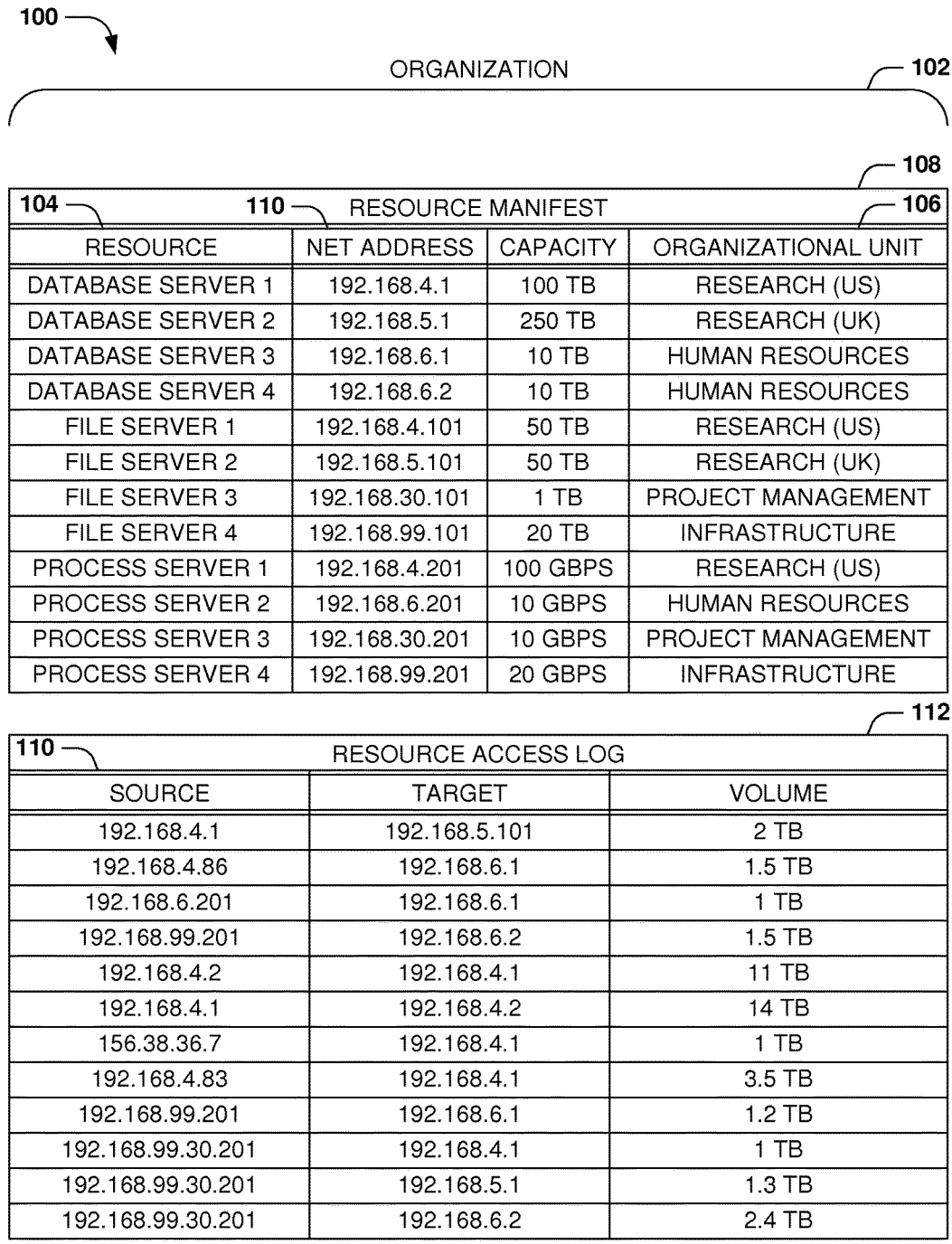
FIG. 1 is an illustration of an example scenario featuring a resource manifest of resources of an organization and a resource access log of accesses arising among the resources of an organization.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring the resources 104 of an organization 102, and various resources that may be utilized to enumerate, document, and describe such resources 104. In this example scenario 100, the resources 104 comprise servers that have been allocated to various organizational units 106, such as divisions or departments within the organization 102 that provide different roles and functions for the organization 102. Respective resources 104 may vary according to name, resource type (e.g., the services and data provided by each server), capabilities (e.g., storage capacity and network bandwidth), and other properties, such as network address 110.

A user of the organization 102, such as an information technology administrator, may prepare and maintain a resource manifest 108 as a record of the resources 104 of the organization 102. For example, the user may insert new records of the manifest when new resources 104 are acquired by the organization 102, and may update the resource manifest 108 when resources 104 are physically relocated, organizationally reassigned to different organization units 106, reconfigured with different equipment, and/or reallocated to store different types of data. The user may also utilize automated techniques to facilitate the preparation of a resource manifest 108, such as a network scanning or enterprise management tool that query each resource 104 of the organization 102, and record the details reported by the resource 104. The user may also have access to a resource access log 112, indicating network interactions between various resource 104, such as transfers of data from a first resource 104 to a second resource 104, or from a user to a resource 104 or vice versa.

A user may endeavor to determine, from the resource manifest 108 and/or the resource access log 112, the organizational structure of the organization 102, such as the resources 104 associated with each organization unit 106; the relationships among resources 104; and the activities that occur among resource 104, such as dependencies of a first resource 104 on a second resource 104 for the provision of data, capabilities such as storage, or functionality such as provided services. To this end, the user may examine the resource manifest 108 to determine which resources 104 are allocated to each organizational unit 106, and may examine the resource access log 112 to determine interactions between resources 104 that may reveal relationships and/or usages. The user may combine this information with his or her knowledge of the organization 102, such as the roles, locations, and interrelationships of the organizational units 106; the activities of the organization 102, and the resources 104 involved in each such activity; and the user's knowledge of interrelationships among resources 104. A user such as an information technology administrator may possess a wealth of such knowledge, and may view the resource manifest 108 and the resource access log 112 through the lens of his or her extensive personal knowledge of the organization 102 to arrive at a comprehensive understanding of the allocation, layout, and roles of the resources 104 of the organization 102.

However, several limitations may arise with the development of organizational knowledge based on records such as a resource manifest and a resource access log, and viewing such records in the context of personal knowledge.

As a first such example, the generation and maintenance of the resource manifest 108 by a user may be time-consuming, inefficient, incomplete, and/or inaccurate. For example, the user may not be informed of the addition, reassignment, or reallocation of resources 104, and/or may record such information incorrectly in the resource manifest 108. Such limitations may arise with unacceptable frequency for organizations 102 that are large, diverse, and sprawling, such that the user is unable to update the resource manifest 108 continuously and to maintain a continuously accurate record of the organization 102.

As a second such example, the detail represented in the resource manifest 108 may be incomplete and misleading; e.g., a database server may be assigned to and managed by a first organization unit 106, but may be primarily utilized by a second organizational unit 106, and/or may be shared among organizational units 106. Such information may not be reflected in the resource manifest 108, and may therefore lead to an inaccurate understanding of the organization 102. Moreover, the user may not have sufficient knowledge of the organization 102 to supplement the missing or inaccurate information; e.g., a newly hired or transferred information technology manager may lack the knowledge of the organization 102 to interpret the resource manifest 108 correctly.

As a third such example, the use of a resource access log 112 to determine relationships among resources 104 may be inadequate. For example, a first resource 104 may have a relationship with a second resource 104 that does not appear in the resource access log, such as a direct communications connection over which the resources 104 may communicate without utilizing a network. Additionally, while the resource access log 112 may indicate interactions among resources 104, it may be difficult to discern an insignificant or ad-hoc interaction from a relationship such as a data or functionality dependency. Moreover, the record of an interaction between a first resource 104 and a second resource 104, or between a resource 104 and a user, may reveal no information about the usage achieved in the interaction or relationship; e.g., a first resource 104 and a second resource 104 may be observed to exchange data, but the interaction may not provide information about; the project or activity to which the interaction relates; the respective roles of the resources 104 in the interaction; and/or the types of data, functionality, and/or services provided by the respective resources 104. A user may only be able to determine that an interaction occurred, without developing a deeper understanding of the relationship and/or usages of the resources 104 participating in the interaction. It may be possible for the user to discover this information through further investigation, and the user may prepare a more complete report of the resources 104 of the organization 102, but such report may be time-consuming to prepare and to maintain, particularly for large organizations.

B. Presented Techniques

The techniques presented herein involve the determination of information about the organizational structure of an organization 102, as well as the number, allocation, relationships, and usages of resources 104 of the organization 102. Such determinations are achieved through automated inferences based upon information that describes the organization 102 and resources 104, and monitoring the interactions among users and resources 104 of the organization 102. A variety of techniques may be applied to a variety of information sources to achieve such inferences, which may inform the automated discovery and presentation of information about the organization 102.

Figure 2:
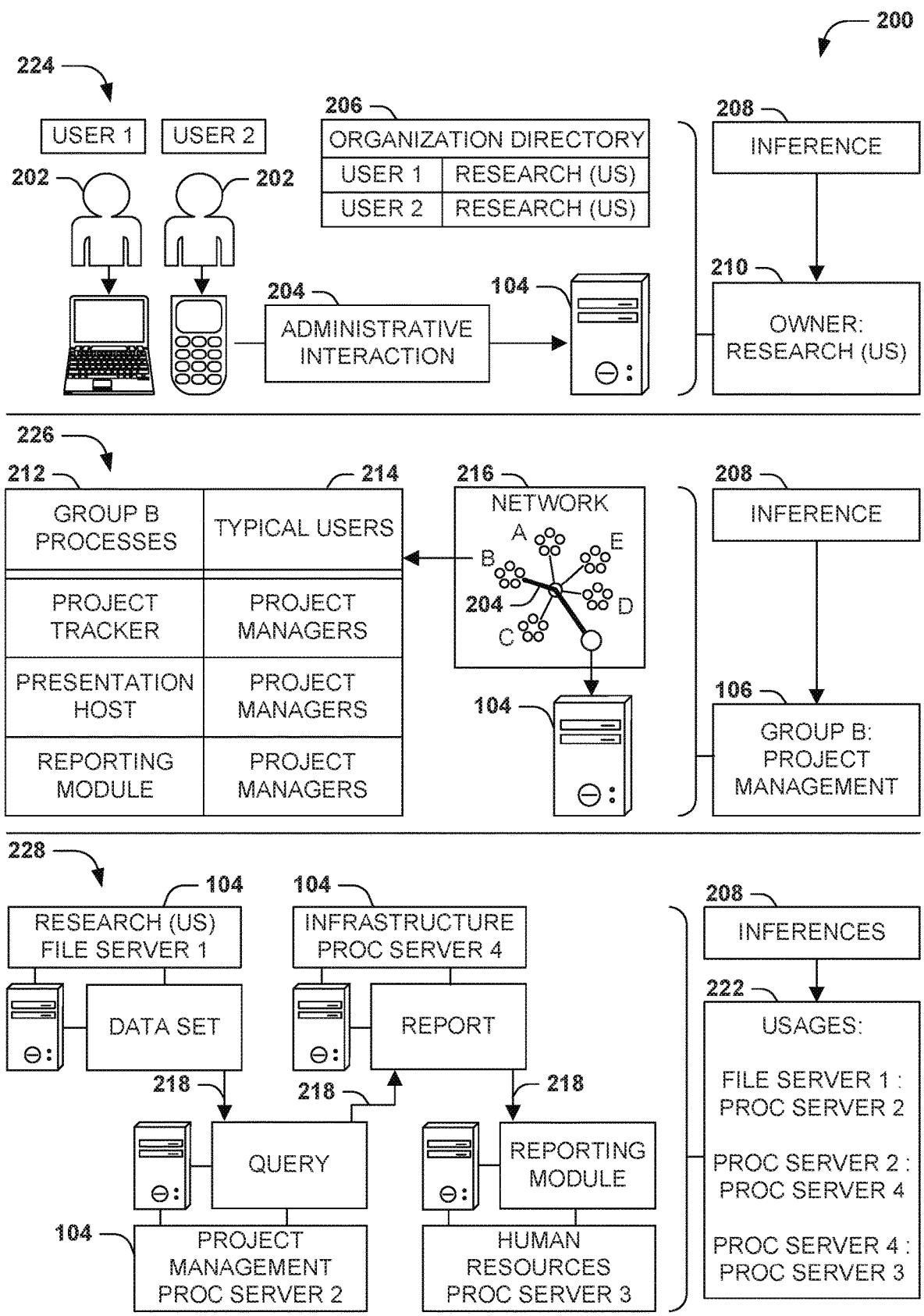
FIG. 2 is an illustration of an example scenario featuring inferences applicable to the resources of an organization, in accordance with the techniques presented herein.

FIG. 2 presents an illustration of an example scenario 200 featuring various techniques for inferring information about the resources 104 of an organization 102.

A first example scenario 224 in FIG. 2 involves a set of users 202 of the organization 102 who, through various devices (e.g., a computer and a mobile device), engage in an interaction 204 with a resource 104 of the organization 102, such as a server. The actions of the users 202 may appear in a resource access log 112 as a record of the interaction 204 with the resource 104, but in accordance with the techniques presented herein, additional information about the interaction 204 may inform inferences 208 about the structure of the organization 102 and the allocation of resources 104 therein. For example, the nature of the interaction 204 may be evaluated, and it may be determined that the users 202 interact with the server 104 in an administrative capacity, e.g., performing various administrative tasks such as creating users and data sets, and establishing and updating user privileges. An inference 208 may be made that the users 202 are acting as administrators of the resource 104 on behalf of a particular organizational unit 106. Additionally, an organization directory 206 may be consulted to determine more information about the users 202, such as the organizational unit 106 to which the users 202 are assigned. The organization directory 206 may indicate that both users 202 are members of a particular organizational unit 106 (e.g., a U.S.-based research division). Together, this information may enable an inference 208 that the resource 104 is administratively assigned 210 to and managed by the organizational unit 106 of the users 202, i.e., that the server is maintained by the U.S. research division.

A second example scenario 226 in FIG. 2 involves inferences 208 about the organizational structure of the organization 102, based on interactions 204 of users 202 and processes with a particular resource 104. In this second example scenario 226, various users 202 of the organization 102 may interact with a particular resource 104, such as a server, and such interactions 204 may be recorded in a document such as a resource access log 112. However, further information about the organization 102 may be determined by evaluating the details of such interactions 204. First, it may be determined that interactions 204 with the resource 104 frequently arise from a particular user group 214, such as a cluster of users 202 who are located within a particular cluster of a network topology of a network 216. The interactions 204 with the resource 104 may also be examined to determine the processes, projects, and/or activities for which the users 202 of the user group 214 interact with the resource 104, such as the types of applications 212 through which the users 202 often interact with the resource 104. Heuristics 2H may be applied to determine the types of organizational units 106 that typically use such application 212; e.g., particular types of software or data sets are typically used by the members of a particular type of organizational unit 106. According to such heuristics 2H, it may be determined that the users 202 of the user group 214 routinely interact with the resource 104 for applications 212 that are characteristic of project management tasks. These heuristics 2H may therefore enable an inference 208 about the nature of the organizational unit 106, i.e., that the user group 214 represents a project management organizational unit 106, and that such organizational units 106 typically fulfill certain types of roles and functions within organizations 102.

A third example scenario 228 in FIG. 2 involves inferences 208 about the relationships 218 and usages 222 of particular resources 104, based upon an evaluation of the interactions thereamong. In this third example scenario 228, various resources 104 engage in interactions 204, such as network communications and instances of data sharing, that may appear in a resource access log 112. However, a deeper evaluation of such interactions 204 may inform inferences 208 of the relationships 218 of the resources 202, such as a data or functionality dependency of a first resource 104 on a second resource 104, and/or relative roles of the resources 104 while engaging in the relationship 218, such as provider/consumer and client/server relations, and the development of authentication, trust, and/or control between the resources 104 of the relationship 218. The interactions 204 may also be evaluated to inform inferences 208 of the usages 222 arising within such relationships 218, such as the particular projects or activities for which the relationships 218 are created or maintained; the type, frequency, volume, direction, and/or significance of exchanged data or functionality; and the capabilities and/or dependencies that are involved for each resource 104 during the usage 222 of the relationship 218 (e.g., the processing and/or network capacity that each resource 104 utilizes while engaging in various usages 222). These and other inferences 208 about the organization 102, organizational units 106, users 202, resources 104, relationships 218, and/or usages 222 may be achieved through such techniques, and may be used to inform users 202 about the organization 102.

Figure 3:
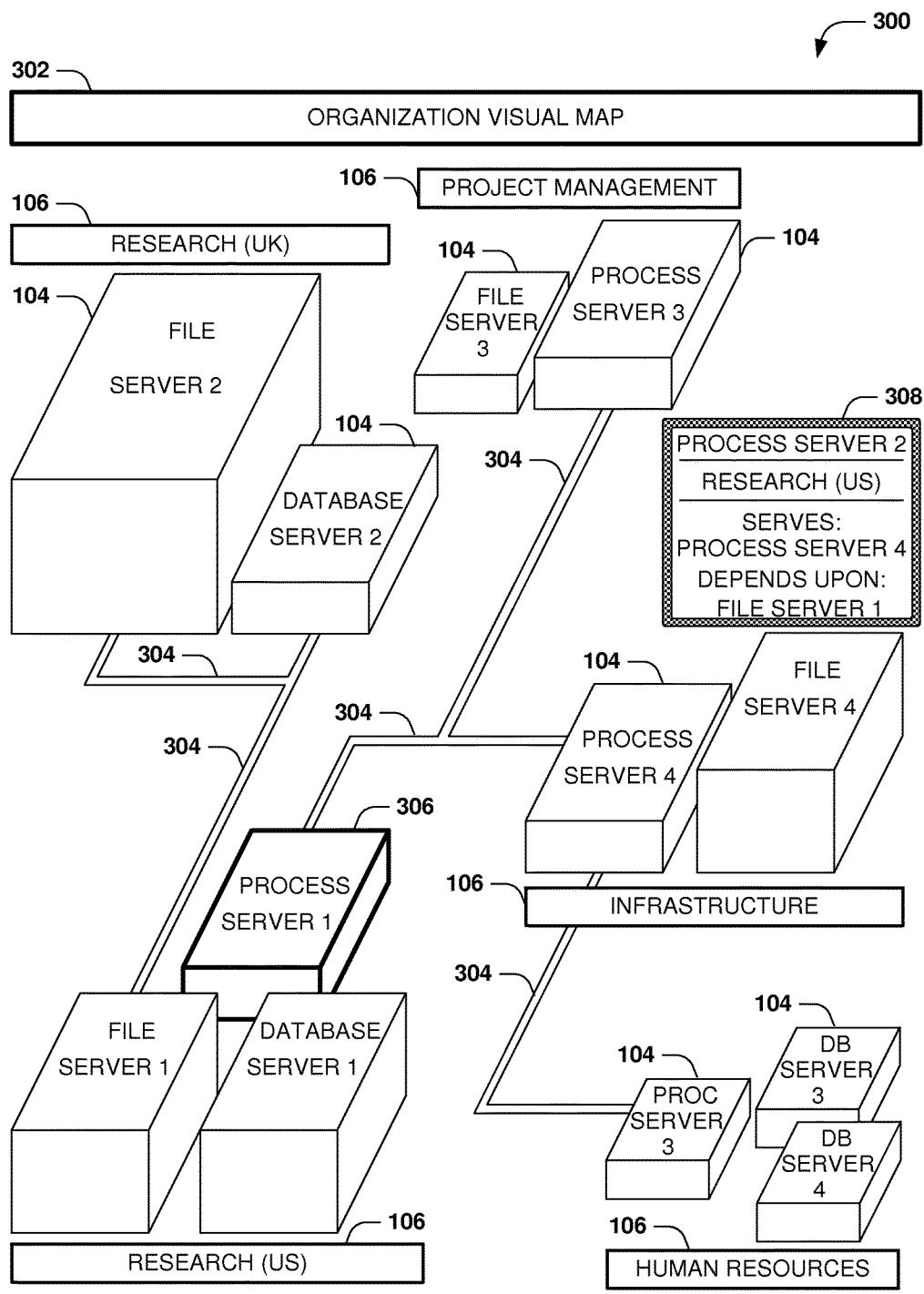
FIG. 3 is an illustration of an interactive visual map of the resources of an organization generated from inferences, in accordance with the techniques presented herein.

FIG. 3 presents an illustration of an example scenario 300 wherein inferences 208, such as those achieved in the example scenario 200 of FIG. 2, are used to automate the generation of an interactive visual map 302 of the institution 102 for presentation to a user 202. In this example scenario 300, respective resources 104 are visually depicted as modules with a size and/or shape selected according to characteristics of the resource 104, such as the storage and/or computational capacity, volume and/or significance of data stored, network bandwidth, and server type. As a first such example, inferences 206 of the organizational unit 206 to which the respective resources 104 are assigned may enable the visual clustering of resources 104 with the respective organizational units 106; e.g., all resources 104 associated with the U.S.-based research division are clustered at the lower-right corner of the visual map 302, as a depiction of the complete set of resources 104 directly assigned to the organizational unit 106. As a second such example, inferences of the relationships 218 between resources 104 may be automatically visualized as a visual connection 304 on the visual map 302 between the related resources 104. As a third such example, inferences of the usages 222 involved in the respective relationships 218 among resources 104 may be described for the user 202; e.g., upon receiving a selection of a selected resource 306, the visual map 302 may be updated with a description 308 of the selected resource 306 including descriptions of the usages 222 of the selected resource 306 by and with other resource 104 of the organization 102. In this manner, inferences about the organization 102 and resources 104 may inform the automated generation of an interactive visual map 302 thereof, in accordance with the techniques presented herein.

C. Technical Effects

Various uses of the techniques presented herein to automate the generation of an interactive visual map 302, based upon automated inferences about the organization 102 and resource 104, may result in a variety of technical effects.

As a first technical effect that may arise from the techniques presented herein, the use of automated inferences 208 to generate information may result in a more comprehensive and accurate description of the organization 102 and resources 104 than techniques based on a combination of less-informative resources, such as resource manifests 108 and resource access logs 112, alone or in combination with the knowledge of the user 202 about the organization 102. For example, the automatically generated interactive visual map 302 may enable a new user 202 to become acquainted with the organization 102 and resources 104, even if the user 202 has little previous knowledge thereof.

As a second technical effect that may arise from the techniques presented herein, the use of automated inferences 208 to discover information about the organization 102 and resources may present greater efficiency than human-mediated processes, which may be comparatively time-consuming and expensive. Additionally, the accuracy of the visual interactive map 302 may exceed that achievable by user-mediated processes, since changes to the structure of the organization 102 and/or allocation and relationships of resources 104 may be automatically and rapidly inferred and incorporated into the visual map 302, without having to await discovery of such changes and the updating of a resource manifest 108 by a user 202.

As a third technical effect that may arise from the techniques presented herein, the automated generation of an interactive visual map 302 may provide a particularly accessible description of the organization 102 and resources 104. For example, a user 202 may navigate through the visual map 302, such as zooming out to view a top-level generalized depiction of the structure of the organization 102, zooming in on areas of interest to view more detail, or selecting on a particular element, such as a resource 306 or connection 304, to view more information about the selected element. The visual map 302 may be updated to reveal information to the user 202 that is suitable for the current view; e.g., the level of detail may be adapted to the current zoom level, such that connections 304 may be aggregated and/or limited in number as the user 202 zooms out to a lower level of detail, and parceled and/or presented in greater detail (e.g., color-coded according to usage) upon zooming in to a higher level of detail. An interactive map 302 such as depicted in the example scenario 300 of FIG. 3 may therefore be more informative and user-accessible than more mechanically structured records, such as the resource manifest list 108 and the resource access log 112 of FIG. 1. Many such technical effects may be achievable in some variations of the techniques presented herein.

D. Example Embodiments

Figure 4:
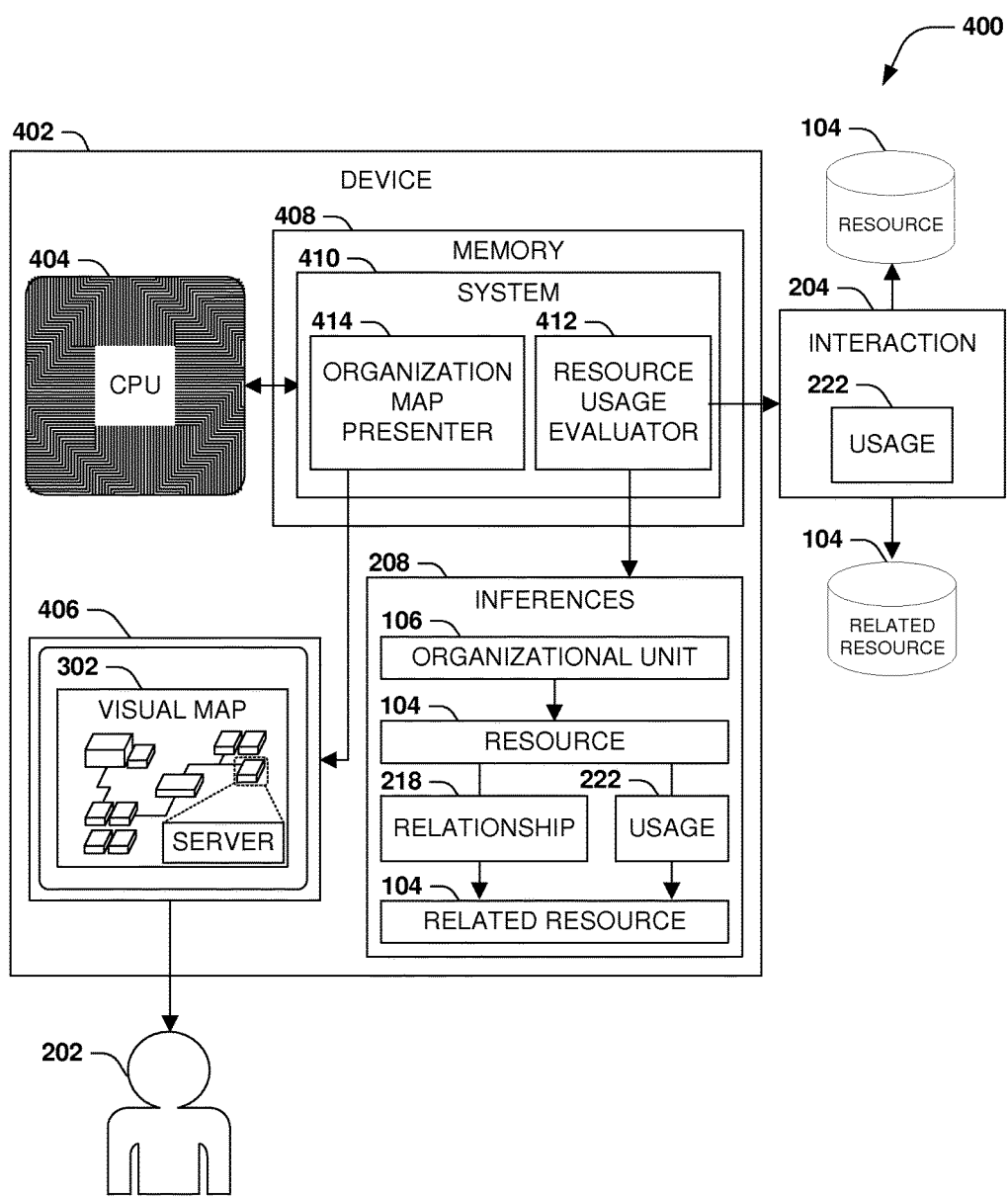
FIG. 4 is an illustration of an example device featuring an example system for presents to a user a visual map of resources of an organization having an organizational structure, in accordance with the techniques presented herein.

FIG. 4 presents a first example embodiment of the techniques presented herein, illustrated as an example device 402 featuring an example system 410 that causes the example device 402 to present a visual map 302 of the resources 104 of an organization 102 to a user 202 in accordance with the techniques presented herein.

In the example scenario 400 of FIG. 4, a device 402 having a processor 404, a display 406, and a memory 408 is utilized by a user 202 to examine the structure of an organization 102 and the allocation of resources 104 therein. The device 402 may create in the memory 408 a system 410 of components that interoperate to achieve the presentation of such a visual map 302 on the display 406 in accordance with the techniques presented herein. The respective components of the system 410 may be implemented, e.g., as a set of instructions that, when executed on the processor 404, cause the device 402 to perform a portion of the techniques presented herein. The example system 410 comprises a resource usage evaluator 412, which monitors an interaction 204 between respective resources 104 of the organization 102 to achieve inferences 208 from the interaction 204, wherein such inferences 208 include, within the organizational structure of the organization 102, an organizational unit 106 to which the respective resources 104 are assigned; a relationship 218 between the resources 104 of the organization 104; and at least one usage 222 of the resource 104 arising within the relationship 218. The resource usage evaluator 412 may utilize a variety of information sources and techniques to achieve such inferences 208, including, e.g., some or all of the information sources and/or techniques illustrated in the example scenario 200 of FIG. 2. The example system 410 further comprises an organization map presenter 414, which presents, on the display 406, a visual map 406 of the resources 104 of the organization 102; and, for respective resources 104 in the visual map 302, presents a description of the usage 222 of the selected resource 104 within the organization 102. In this manner, the example system 410 causes the example device 402 to generate and present the visual map 402 of the organization 102 to the user 202 based upon inferences 208 derived from the interactions 204 among the resources 104 in accordance with the techniques presented herein.

Figure 5:
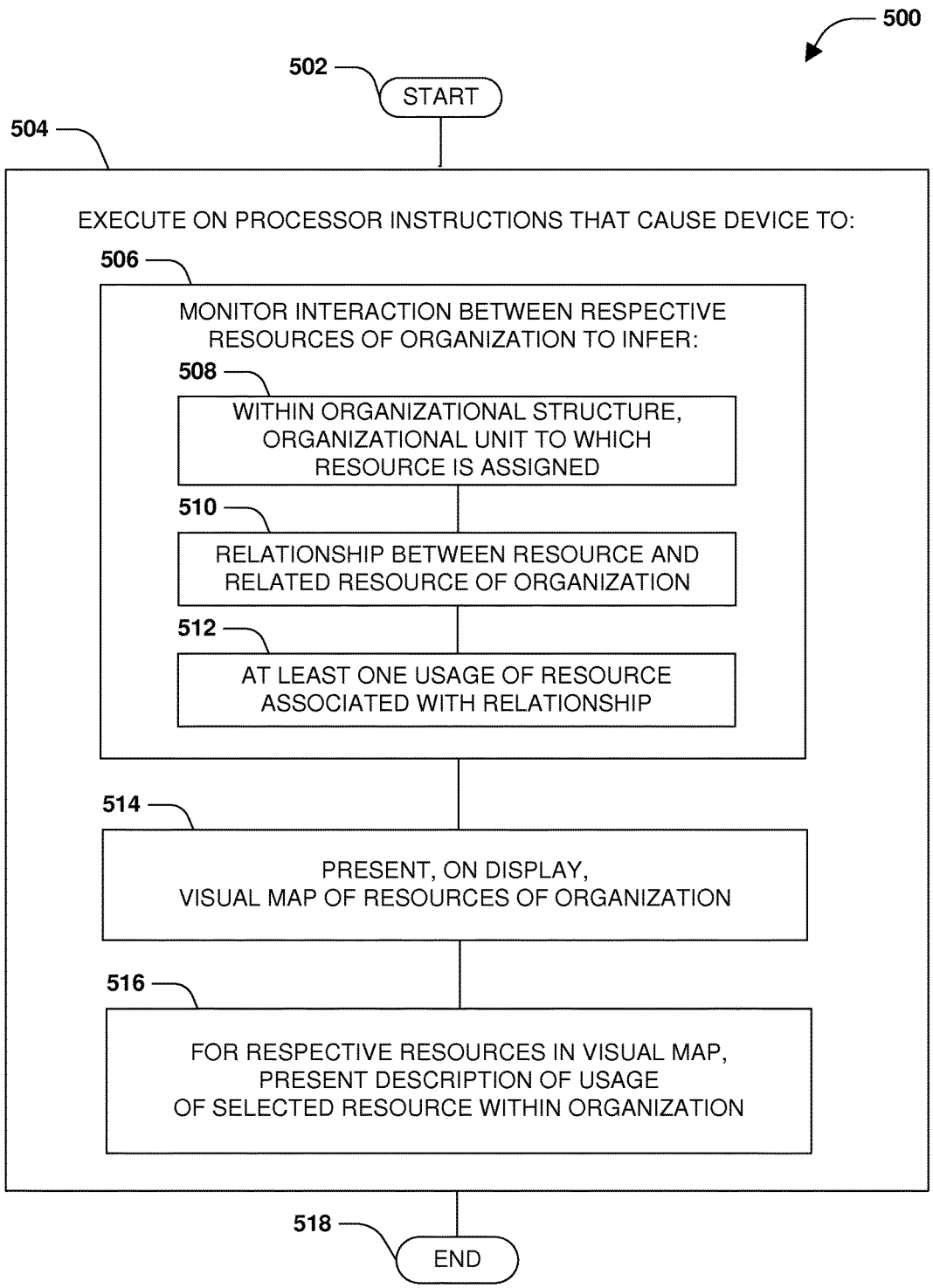
FIG. 5 is an illustration of a first example method of presenting resources of an organization having an organizational structure to a user of a device having a processor and a display, in accordance with the techniques presented herein.

FIG. 5 presents a second example embodiment of the techniques presented herein, illustrated as an example method 500 of presenting, to a user 202 of a device having a processor and a display, resources 104 of an organization 102 having an organizational structure. The example method 500 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 500 begins at 502 and involves executing 504 the instructions on a processor of the device. Specifically, executing 504 the instructions on the processor causes the device to monitor 506 an interaction 204 between respective resources 104 of the organization 102 to achieve inferences 208 from the interaction 204 that include, within the organizational structure of the organization 102, an organizational unit 106 to which the resource 104 is assigned 508; a relationship 218 between the resource 104 and a related 510 resource 104 of the organization 102; and at least one usage 222 of the resource 104 associated 512 with the relationship 218. Executing the instructions on the processor also causes the device to present 514, on the display, a visual map 302 of the resources 104 of the organization 102. Executing the instructions on the processor also causes the device to, for respective resources 104 in the visual map 302, present 516 a description 308 of the usage 222 of the selected resource 306 within the organization 102. In this manner, the example method 500 enables the device to describe the organization 102 and resources 104 to the user 202 through an automatically generated visual map 302 based on inferences derived rom interactions 204 of resources 104 in accordance with the techniques presented herein, and so ends at 518.

Figure 6:
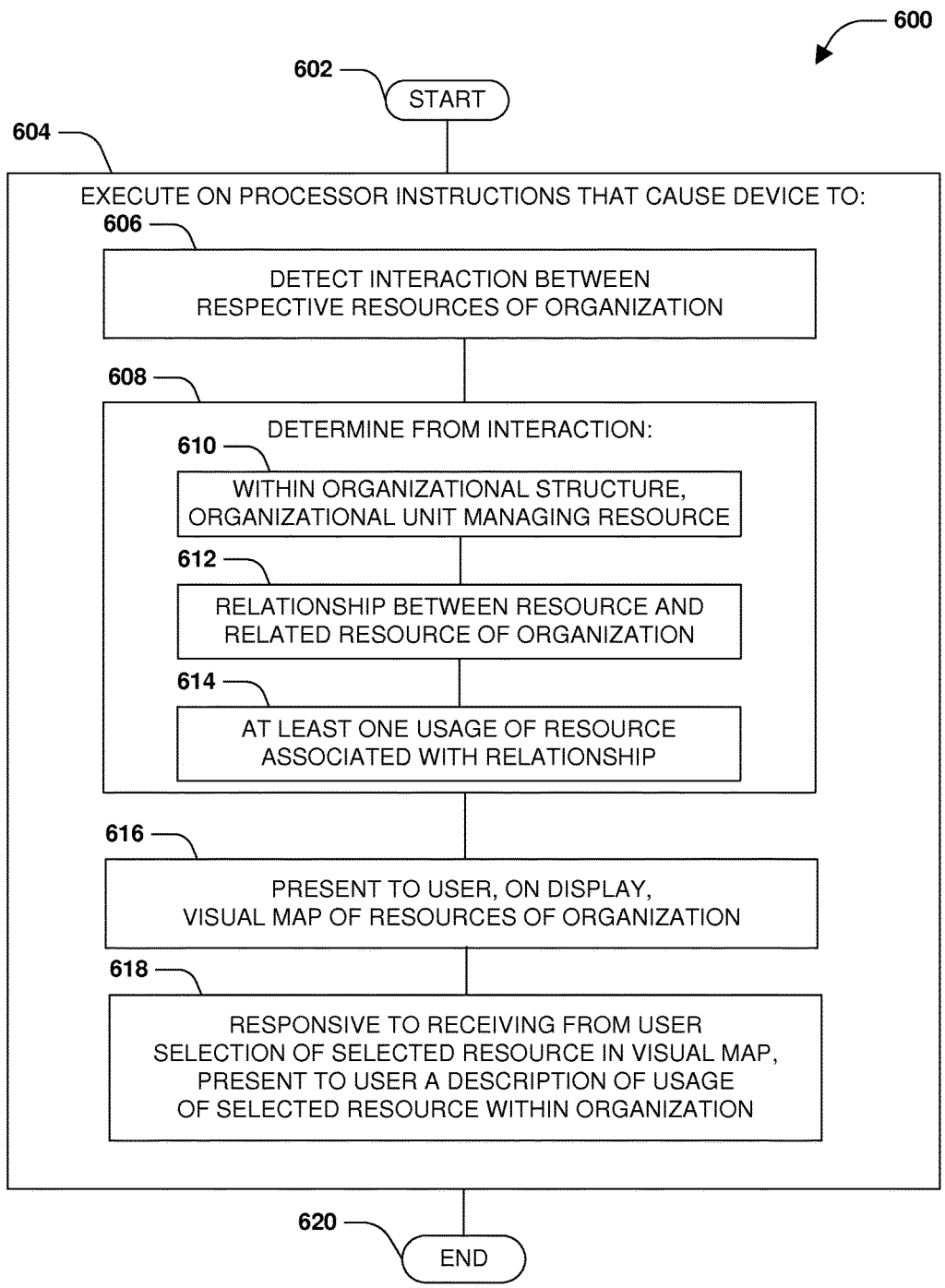
FIG. 6 is an illustration of a second example method of enabling a user to interact with resources of an organization having an organizational structure, in accordance with the techniques presented herein.

FIG. 6 presents a third example embodiment of the techniques presented herein, illustrated as an example method 600 of enabling a user 202 to interact with resources 104 of an organization 102 having an organizational structure. The example method 600 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 600 begins at 602 and involves executing 604 the instructions on a processor of the device. Specifically, executing 604 the instructions on the processor causes the device to detect 606 an interaction 204 between respective resources 104 of the organization 102. Executing 604 the instructions on the processor further causes the device to determine 608, from the interaction 204, an organizational unit 106 to which the resource 104 is assigned 610 within the organizational structure of the organization 102; a relationship 218 between the resource 104 and a related 612 resource 104 of the organization 102; and at least one usage 222 of the resource associated 614 with the relationship 218. Executing 604 the instructions on the processor further causes the device to present 616 to the user 202, on the display 406, a visual map 302 of the resources 104 of the organization 102. Executing 604 the instructions on the processor further causes the device to, responsive to receiving from the user 202 a selection of a selected resource 306 in the visual map 302, present 618 to the user 202 a description 308 of the usage 222 of the selected resource 306 within the organization 102. In this manner, the example method 600 enables the device to provide the user 202 with an interactive visual map 302 of the resources 104 of the institution 102 in accordance with the techniques presented herein, and so ends at 620.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 7:
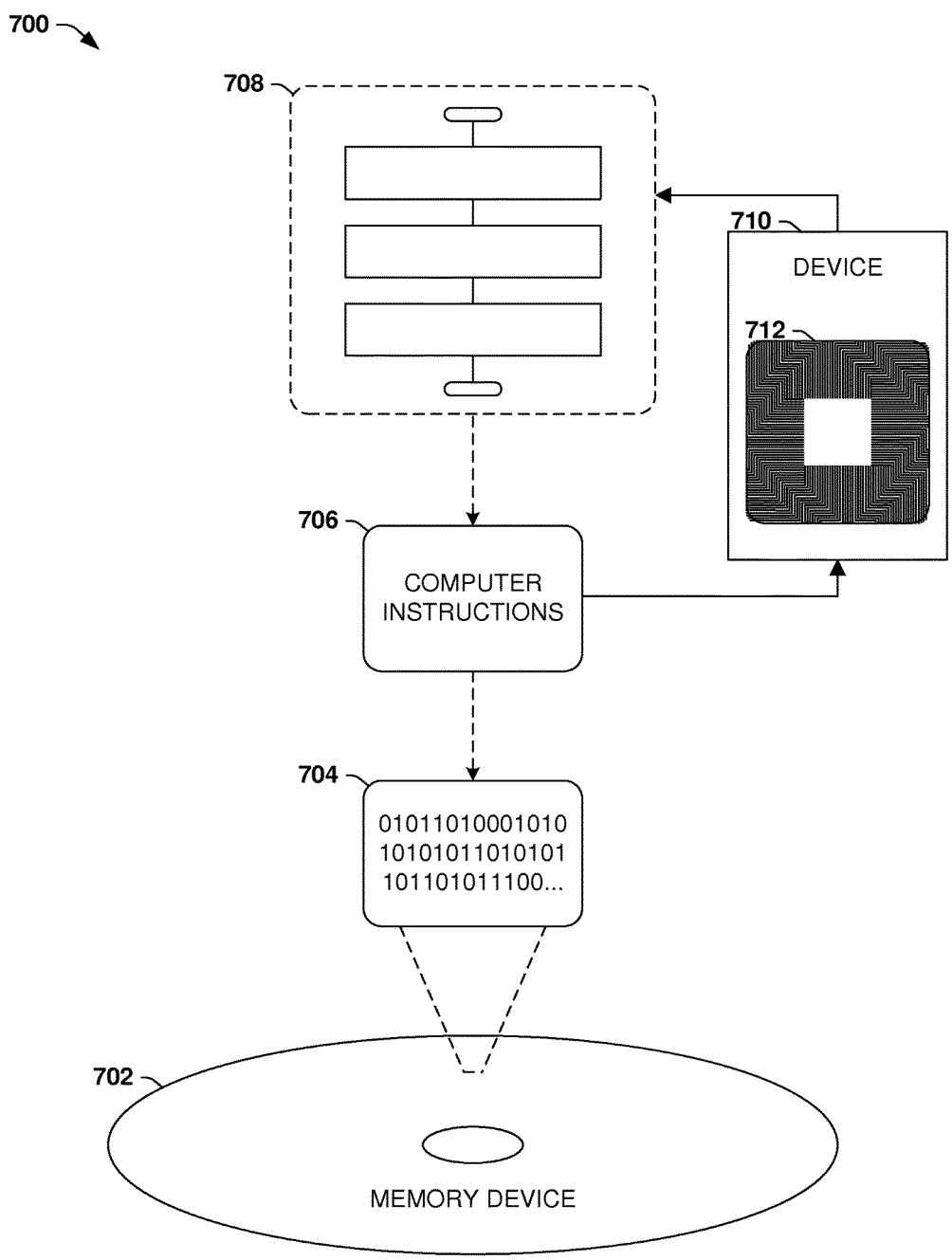
FIG. 7 is an illustration of an example memory device storing instructions that cause a device to presents to a user a visual map of resources of an organization having an organizational structure, in accordance with the techniques presented herein.

An example computer-readable medium that may be devised in these ways is illustrated in FIG. 7, wherein the implementation 700 comprises a memory device 702 (e.g., a CD-R, DVD-R, or a platter of a hard disk drive), on which is encoded computer-readable data 604. This computer-readable data 704 in turn comprises a set of computer instructions 706 that, when executed on a processor 712 of a device 710, cause the device 710 to perform flowchart 708 according to the principles set forth herein.

In a first such embodiment, the processor-executable instructions 706 may create in a memory 408 of the device 402 a system for presenting a visual map 302 of the resources 104 of an organization 102 to a user 202 based upon inferences 208 derived from interactions 204 of the resources 104 in accordance with the techniques presented herein, such as the example system 410 in the example scenario 400 of FIG. 4.

In a second system embodiment, the processor-executable instructions 706 may provide a method of presenting a visual map 302 of the resources 104 of an organization 102 to a user 202 based upon inferences 208 derived from interactions 204 of the resources 104 in accordance with the techniques presented herein, such as the example method 500 of FIG. 5.

In a third such example, the processor-executable instructions 706 may cause a device to perform a method of presenting a visual map 302 of the resources 104 of an organization 102 to a user 202 based upon inferences 208 derived from interactions 204 of the resources 104 in accordance with the techniques presented herein, such as the example method 600 of FIG. 6. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example system 410 of FIG. 4; the example method 500 of FIG. 5; the example method 600 of FIG. 6; and/or the example memory device 702 of FIG. 7) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices and servers, such as workstations, laptops, tablets, mobile phones, game consoles, portable gaming devices, portable or non-portable media players, media display devices such as televisions, appliances, home automation devices, computing components integrated with a wearable device integrating such as eyewear or a watch, and supervisory control and data acquisition (SCADA) devices.

As a second variation of this first aspect, the techniques presented herein may be utilized to present a visual map 302 of resources 104 for many types of organizations 102, such as public and/or private companies; international, national, and/or local governments and/or regulatory bodies; non-profit institutions, such as schools and hospitals; social communities, such as the members of a township or a club; and social networks, such as friends and families. Such organizations 102 may also include a wide variety of organizational units 106, such as administrative units, research units, finance and human resources units, infrastructure units such as information technology and security, research and/or product development units, and client-facing units such as customer service. Additionally, such organizations 102 may be comprised of various arrangements of organizational units 106, such as a hierarchy, aggregation, or network, and/or may be divided into organizational units 106 in various ways, such as by function, by geography, by size, by client or research type, and/or by product or service category.

As a third variation of this first aspect, the techniques presented herein may be utilized to present a visual map 302 of many types of resources 104 of the organization 102, such as databases and data sets; media items, such as recordings and/or libraries of text, audio, pictures, and/or video; content sources, such as web pages or websites; one or more processes or applications executing on a device; one or more physical devices, such as device peripherals sensors, and/or autonomous robots; and one or more real and/or virtual environments. Respective resources 104 presented in the visual map 302 may also be owned, managed, maintained, licensed by, secured by, and/or stored within the organization 102, and/or may be external to the organization 1042 such as a publicly provided database or data set that is of interest to a particular organization 102.

As a fourth variation of this first aspect, respective users 202 interacting with the resources 104 and/or the visual map 302 may have various roles in the organization 102, such as an administrator, owner, customer, client, end user, subject, analyst, and/or beneficiary of one or more resources 104. Many such scenarios may be devised wherein part or all of the techniques presented herein may be advantageously utilized.

E2. Drawing Inferences of Organizational Structure, Resources, and Usages

A second aspect that may vary among embodiments of the techniques presented herein involves the manner of drawing inferences 208 about the organization 102 (e.g., the number, relationships, and types of organizational units 106 and/or the assignment of resources 104 thereto) and/or about the resources 104 (e.g., the number, types, interrelationships, and usages 222 of the resource 104) based upon the interactions 204 among resources 104 and users 202.

As a first variation of this second aspect, many information sources may be utilized to inform such inferences 208 about the organizational units 106 and assignment of resources 104. As a first example of this first variation of this second aspect, a memory of a device may further store an organizational map describing the organizational structure of the organization 102. Inferences 208 of the organizational units 106 to which respective resources 104 are assigned may be drawn by identifying a position of the resource 104 within the organizational map, and identifying the organizational unit 106 associated with the position of the resource 104 in the organizational map. As a first such example, the organizational map may comprise a network map that indicates particular ranges of network addresses that have been reserved for particular organizational units 106 of the organization 102, and a resource 104 may be inferred as assigned to the organizational unit 106 if it has been allocated a network address within a reserved range. As a second such example, the organizational map may comprise a physical map indicating the physical locations of respective organizational units 106 of the organization 102, and a resource 104 may be inferred as assigned to a particular organizational unit 106 by identifying its physical location (e.g., using a Global Positioning System (GPS) receiver) and identifying the organizational unit 106 encompassing the location of the resource 104. A second example of this first variation of this second aspect is illustrated in the example scenario 200 of FIG. 2, wherein a device has access to an organizational directory of the organization 102, and inferences of organizational units 106 of the organization 102 may be identified according to the organizational directory. Accordingly, an embodiment of the techniques presented herein may identify a user 202 within the organization 102 who uses a particular resource 104; identify the organizational unit 106 of the user 202 of the resource 104; and therefore draw an inference 208 of a relationship 218 between the resource 104 and related resources 104 of the organizational unit 106 to which the user 202 of the resource 104 is assigned.

As a second variation of this second aspect, a variety of techniques may be utilized to draw such inferences 208 from the information sources. The example scenario 200 of FIG. 2 presents a first example of this second variation of this second aspect, wherein heuristics are utilized to identify the organization type of a particular organizational unit 106, which may inform further inferences about the associations of users 202, resources 104, and organizational units 106.

Figure 8:
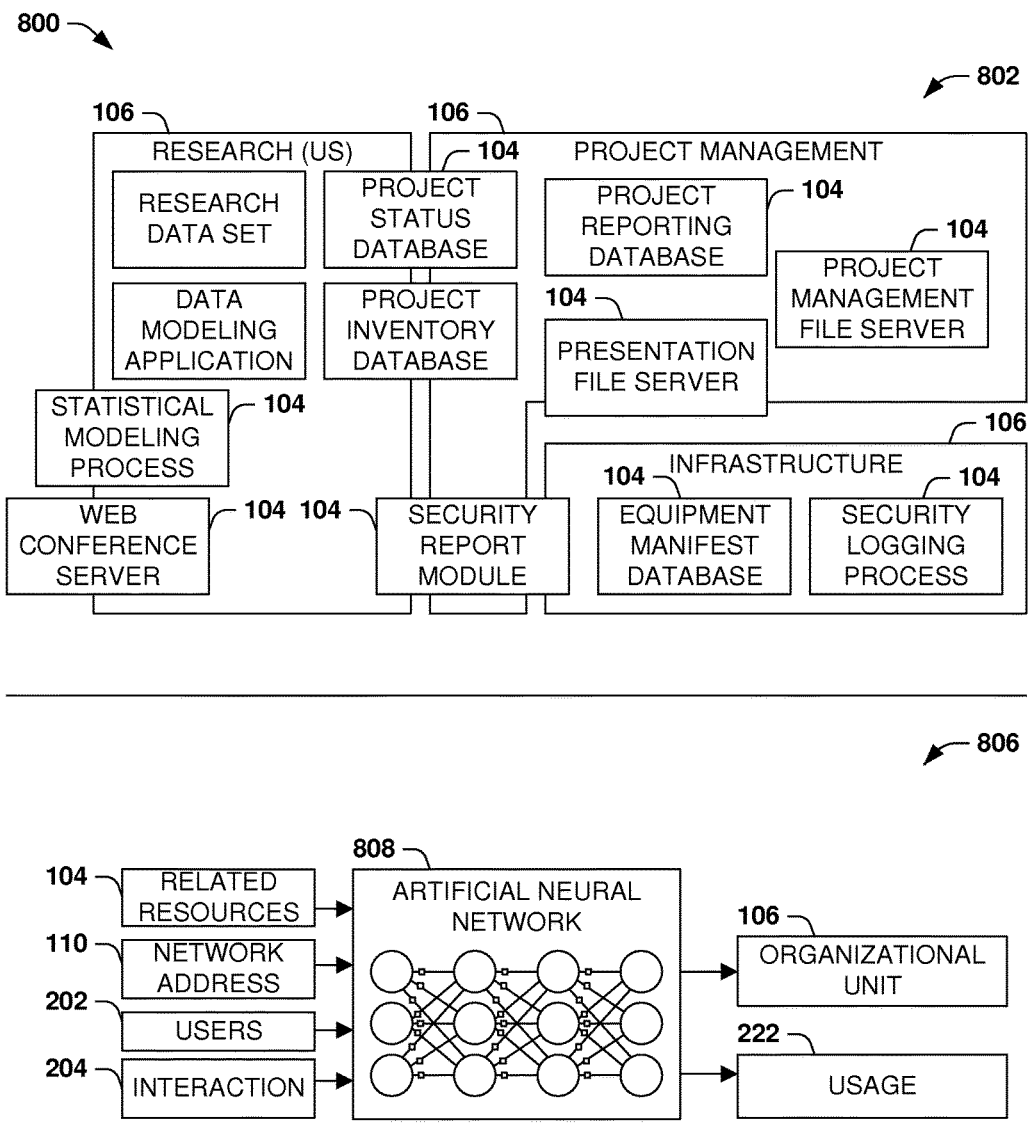
FIG. 8 is an illustration of example scenarios featuring techniques for performing inferences of the organizational structure and the allocation, relationships, and usages of organizational resources, in accordance with the techniques presented herein.

FIG. 8 presents an illustration set of example scenarios 800 that provide additional examples of techniques that may be utilized to draw inferences about organizational units 106 and resources 104. As a second example 802 of this second variation of this second aspect, inferences 208 of the organizational units 208 to which respective resources 104 are assigned may be achieved by clustering respective resources 104 with related resources 104 of the organization 102 according to at least one resource property. For example, resources 104 may be clustered according to resource types, optionally guided by heuristics indicating the contexts in which resources 104 of the respective resource types are typically utilized in order to match respective resources 104 with an organizational unit 106 of the organization 102. Additionally, a resources 104 that are frequently accessed by the same group of users, that are accessed from the same range of devices and/or network addresses, that are accessed within the same time frames, and/or that are accessed in order to interact with one another may be clustered together. The clustering techniques may involve classification (e.g., using a Bayesian classifier) and/or probabilistic determination to identify an organizational unit 106 having the highest probability of having been assigned the resource 104, and such clustering techniques may enable resources 104 that having a proximity to related resources 104 within the clustering of the organization 102 may be inferred as assigned to the same organizational unit 106.

As a third example 806 of this second variation of this second aspect, various adaptive algorithms may be utilized to draw inferences about organizational units 106, resources 104, relationships 218, and/or usages 222 arising thereamong. As one such example, an artificial neural network 808 may be provided that has been trained to, based upon a set of inputs describing a resource 104, identify the organizational unit 106 to which the resource 104 has likely been assigned and/or the usages 222 that likely arise within the relationships 218 of the resource 104. Following training of the artificial neural network 808, for a particular resource 104, inputs may be gathered such as the interaction 204 of the resource 104 with other resources 104 of the organization 102, the users 202 who access the resource 104, and a network address 110 of the resource 104, and provided to the artificial neural network 808 to infer the organizational unit 106 to which the resource 104 has likely been assigned, as well as the usages 222 for which the resource 104 is likely utilized.

As a third variation of this second aspect, many techniques may be utilized for inferences 208 about particular resources 104 of the organization 102 based on interaction of the resource 104 with other resources 104 of the organization 102. As a first such example, a relationship 218 and/or usage 222 may be inferred through a configuration of a first resource 104 to interact with a second resource 104 as a server or superior resource, and a configuration of the second resource 104 to interact with the first resource 104 as a client or subordinate resource 104. As a second such example, a relationship 218 and/or usage 222 may be inferred through a data or functionality dependency, e.g., wherein a first resource 104 provides data, capabilities such as storage, and/or services that are consumed by a second, related resource 104. As a third such example, a relationship 218 and/or usage 222 may be inferred based upon network interaction between a first resource 104 and a second, related resource 104, e.g., determining that the resources 104 regularly communicate at a particular scheduled date and time, and/or regularly exchange a particular type of data.

As a fourth variation of this second aspect, many techniques may be utilized to identify and evaluate particular interactions 204 among resources 104 and users 202 of the organization 102 to infer relationships 218 and usages 222 arising thereamong. In some scenarios, the investigation of particular interactions 204 may be difficult due to the volume and/or distribution of the users 202 and resources 104; e.g., a globally distributed enterprise may feature a large number of users located in various countries and interacting with different clusters of resources 104, and determining the relationships 218 and usages 222 thereamong may be difficult due to the scope of the interaction network. For example, an inference process executing in one country may have difficulty monitoring the interactions of users 202 with resources 104 in a distant country, due to limitations such as network bandwidth constraints and network latency.

Figure 9:
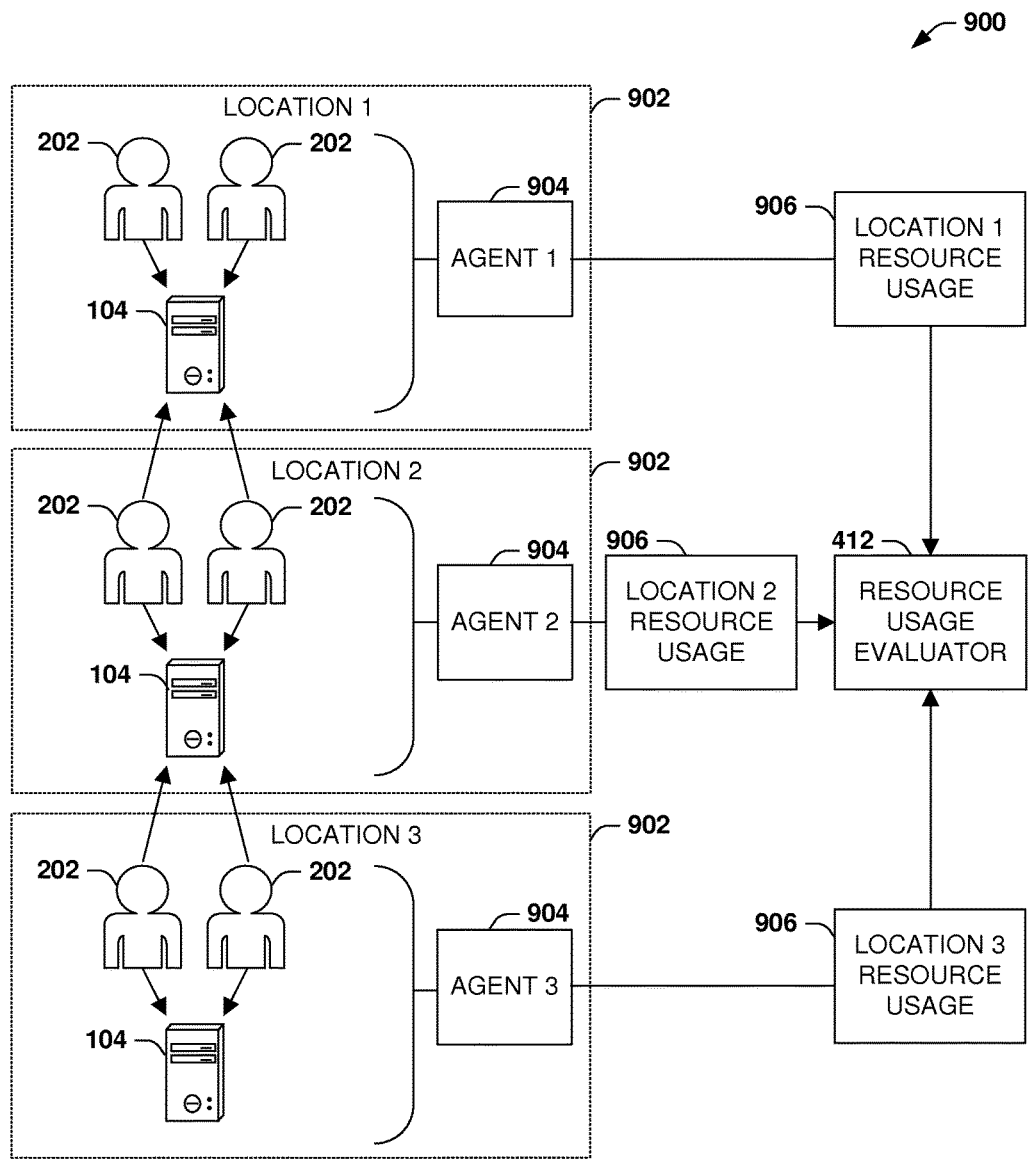
FIG. 9 is an illustration of example scenarios featuring a distributed agent network that enables inferences of usages of resources by users and other resources, in accordance with the techniques presented herein.

FIG. 9 presents an illustration of an example scenario 900 featuring one technique for evaluating interactions 204 to infer relationships 218 and usages 222 within respective organizational units 106 of the organization 102. In this example scenario 900, an organization 102 is distributed across a variety of locations 902, each featuring a set of users 202 interacting with a subset of resources 104 of the organization 102. In order to provide a coordinated and comprehensive evaluation of such interactions 204 that informs a resource usage evaluator 412, a distributed agent network may be devised, wherein respective usage monitoring agents 904 are deployed to a location 902 to monitor and evaluate the interactions 204 arising among the users 202 and resources 104 of that location 902. For example, if an organization 102 is distributed across five offices that are physically distant, a network server within each office may execute a process providing a usage monitoring agent 904 that monitors the interaction of users 202 and resources 104 specifically within the office. Respective usage monitoring agents 904 may infer relationships 218 and/or usages 222 for the location 902, and may issue a resource usage report 906 for location 902 to the resource usage evaluator 412, which may generate a comprehensive set of inferences 208 of relationships 218 and usages 222 of the resources 104, and may inform an organization map presenter 414 of such information in order to achieve a fully detailed and comprehensive visual map 302 of the organization 102 and resources 104. Many such techniques may be utilized to generate inferences 208 about the organization 102, organizational units 106, users 202, resources 104, relationships 218, and usages 222 arising thereamong in accordance with the techniques presented herein.

E3. Generating Visual Map of Organization and Resources

A third aspect that may vary among embodiments of the techniques presented herein involves the automatic generation of an interactive visual map 302 of the organization 102 and resources 104, based upon inferences derived from the interactions 204 among resources 104 and users 202.

As a first variation of this third aspect, the spatial layout and/or appearance of the resources 104 in the visual map 302 may be selected according to many criteria, several of which are depicted in the example scenario 300 of FIG. 3. As a first such example, the visual map 302 may cluster resources 104 with the organizational unit 106 to which the resource 104 is assigned. As a second such example, respective resources 104 may be presented on the visual map 302 with a position and/or appearance selected according to a resource property of the resource 104 (e.g., a resource type, capability, and/or role), and/or according to a usage 222 of the resource 104 within the organization 102 (e.g., selecting a size and/or color-coding of respective resources 104 that conveys a priority of the tasks performed by the resource 104 for the organization 102).

Figure 10:
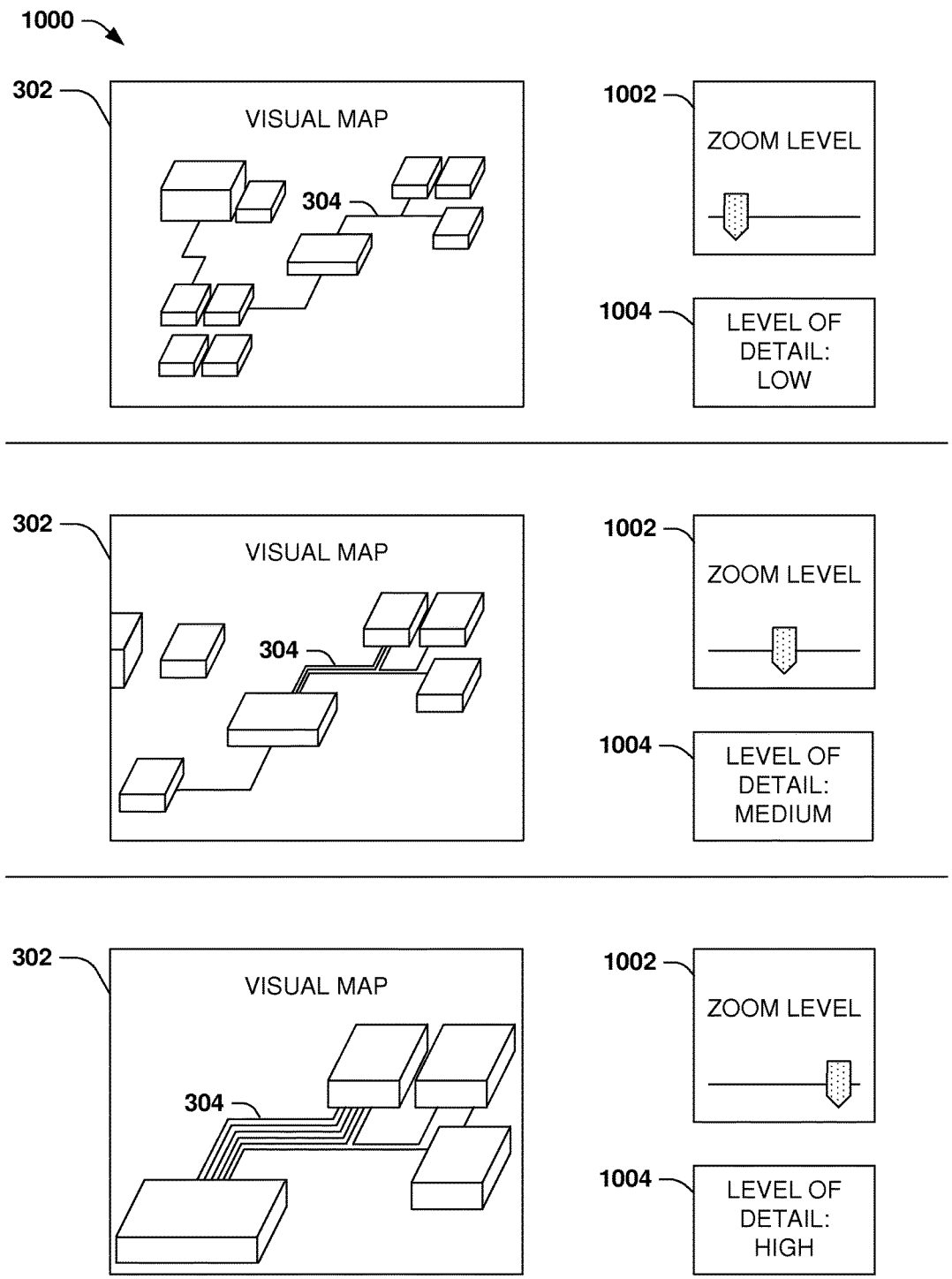
FIG. 10 is an illustration of example scenarios featuring a presentation of the resources of an organization as a visual map based upon a variable level of detail, in accordance with the techniques presented herein.

FIG. 10 presents an illustration of an example scenario 1000 featuring a set of second variations of this third aspect, wherein the visual map 302 includes one or more visual connections 304 that respectively visualize the relationships 218 between a resource 104 and a related resource 104. Such visual connections 304 may comprise, e.g., a matching visual appearance (e.g., presenting resources sharing a relationship 218 using a corresponding color, shading, pattern, shape, and/or position along at least one axis within the visual map 302), and/or, as presented in the example scenario 1000 of FIG. 10, a visual line connecting each resource 104 involved in the relationship 218. Additionally, as presented in the example scenario 1000 of FIG. 10, a level of visual detail 1004 may be selected for the visual map 302. Various elements of the visual map 302 that exceed the selected level of visual detail 1004 may be removed, aggregated, and/or consolidated. Conversely, various elements of the visual map 302 that does not yet meet the selected level of visual detail 1004 may be elaborated, e.g., by presenting more detail about the visual element, and/or apportioning one element into subparts that are separately presented in the visual map 302. For example, a first resource 104 and a second resource 104 may have a relationship 218 including numerous usages 222, which may be presented together as a single connection 304 when the visual map 302 is presented at a low level of visual detail 1004, and presented increasing increments of singularity at successively higher levels of visual detail 1004.

Further variations in the use of the level of visual detail 1004 may be included in the visual map 302. As a first such example, and as presented in the example scenario 1000 of FIG. 10, the level of visual detail 1004 may be controlled by a user 202 through selectable zoom level 1004, wherein zooming in on a portion of the visual map 302 raises the level of visual detail 1004, and zooming out to view a greater portion of the organization 102 lowers the level of visual detail 104 of the visual map 302. Alternatively or additionally, the level of visual detail 1004 may be adjusted according to a user preference of the user 102, and/or properties of the device on which the visual map 302 is presented, such as the display size and resolution. As a second such example, the level of visual detail 1004 may be implemented in the visual map 302 in various ways; e.g., at any particular zoom level 1002, a level of visual detail 1004 may be selected as a range of visual elements to be viewable at the zoom level 1002 (e.g., limiting the number of connections 304 displayed at a given zoom level 1002 to a maximum of twelve), such that connections 304 are consolidated and/or selectively removed (e.g., based on a priority ranking) until the constraint on the number of visualized connections 304 is satisfied.

As a third set of variations of this third aspect, many types of interactivity may be included and implemented in the presentation of the visual map 302. As a first such example, responsive to receiving from the user 202 a selection of a selected resource 306, the visual map 302 may describe the selected resource 306 (e.g., a key performance pane may be inserted adjacent to the visual map 302 and depicting a list of metrics or symbols that indicate the key performance metrics of the selected resource 306, and/or usage indicators of the usages 222 of the resource 104 within various the relationships 218 with other resources 104). As a second such example, the user 202 may adjust various other properties of the view of the visual map 302 that may affect the level of detail 1004; e.g., if the user 202 is interested in a particular subset of resources 104, such as those according to a particular resource type, the level of visual detail 1004 may be raised selectively for resources 104 of the specified resource type and lowered for resources 104 of different types, thereby providing an adjustable and incremental filter that may be controlled to adjust a degree of filtering of the visual map 302.

Figure 11:
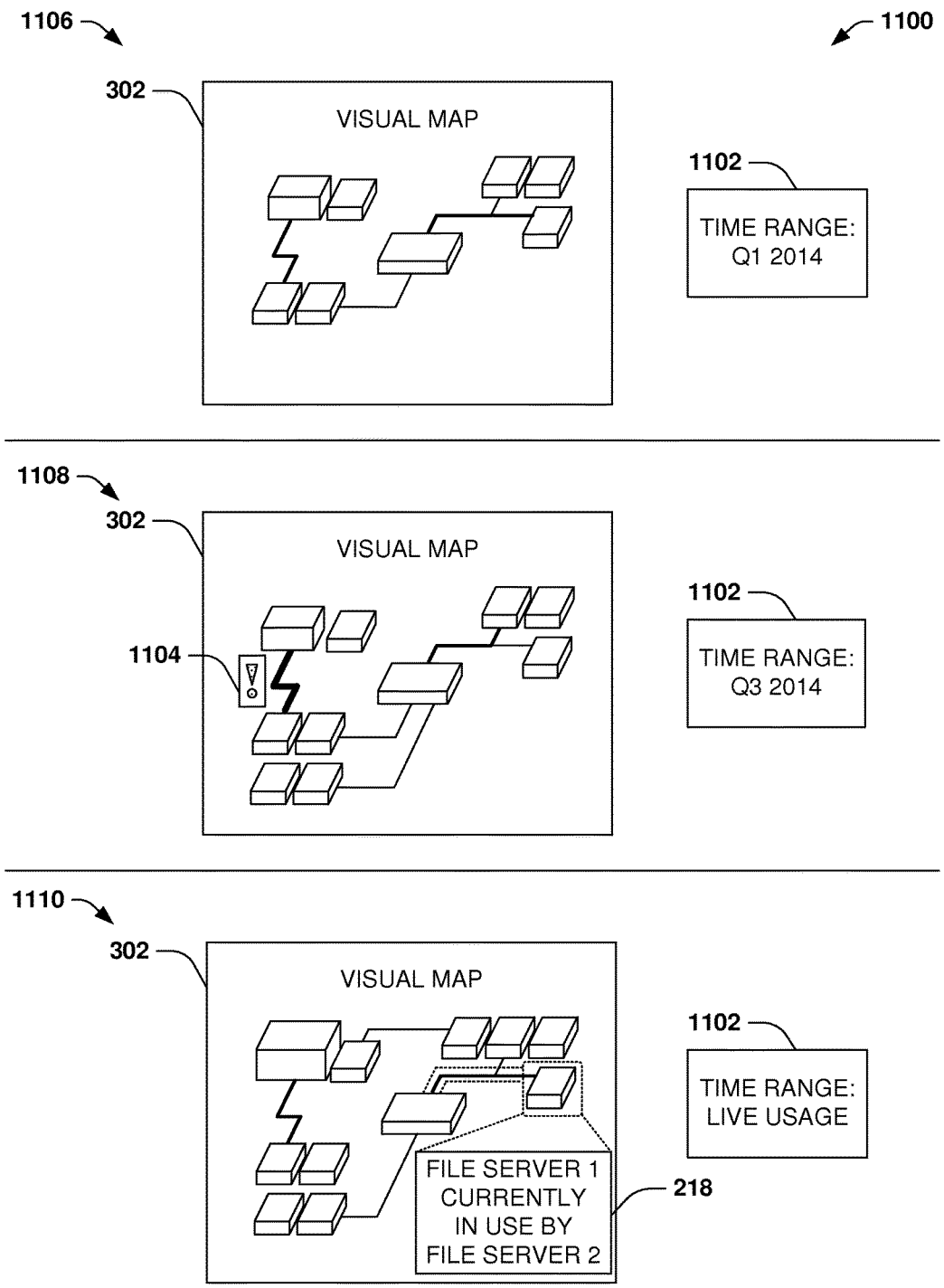
FIG. 11 is an illustration of an example scenario featuring a presentation of the resources of an organization as a visual map based upon a time range, in accordance with the techniques presented herein.

FIG. 11 presents an illustration of a third example of this third variation of this third aspect, wherein the visual map 302 is viewable according to a time range 1102. For example, the set of organizational units 106, resources 104, relationships 218, and/or usages 222 may be tracked over time as a record of the progression of the organization 102 (e.g., changes between a first time 1106 and a second time 1108). A user 202 may specify various time periods during which the visual map 202 is to depict the organization 102, and the visual map 302 may correspondingly present the resources 104 comprising the organization 102 during the selected time range 1102. Additionally, the visual map 302 may present usage indicators of the usages 222 of the resources 104 specifically within the selected time range 1102, e.g., as a depiction of network capacity, usage, and sufficiency throughout the organization 102 at the selected time range 1102. In one such variation 1110, the user 102 may choose a current time range in order to request a visual map 302 of current usages 222, and the visual map 1110 may be limited to present usage indicators of current usages of resources 104 at the current time.

As a fourth set of variations of this third aspect, the visual map 1110 of the resources 104 of the organization 102 may be presented in a manner that enables navigation to present the resources 104 from various perspectives within the visual map 302. As a first such example, the navigation may be driven by a user, e.g., based on directional controls that alter the position, orientation, velocity, acceleration, and/or zoom level of the perspective within the visual map 302. As a second such example, the navigation may follow a navigation track, such as a predefined or computationally generated path that transitions among a set of perspectives within the visual map 302. The navigation track may be prerecorded (e.g., by recording the navigation of a user within the visual map 302, and replaying the navigation for the same user or a second user), or may reflect be generated by a query (e.g., a query may generate a list of resources 104 in a particular order, and the navigation may visually transition the perspectives of the visual map 302 to focus on each resource 104 in order). The navigation path may also be specified, e.g., as a set of locations such as coordinates within the visual map 302; as the directional control of the perspective, such as a sequence of changes in position, orientation, velocity, or acceleration; a sequence of resources 104 upon which to focus the perspective of the visual map 302; and/or a query that generates the coordinates, resources, or other navigational directions that are applicable to the perspective of the visual map 302. Additionally, the transition of the perspective within the visual map 302 may be visually achieved in many ways, such as a discrete jump or dissolve from a first perspective and a second perspective, and/or a smooth transition from the first perspective and the second perspective. The navigational directions may also include timing information (e.g., the speed of transition, and/or the amount of time to spend focusing on a particular resource 104); annotations (e.g., information to display when presenting a particular perspective); and/or other visual information (e.g., directions to highlight particular resources 104 when presented from a particular perspective).

Figure 12:
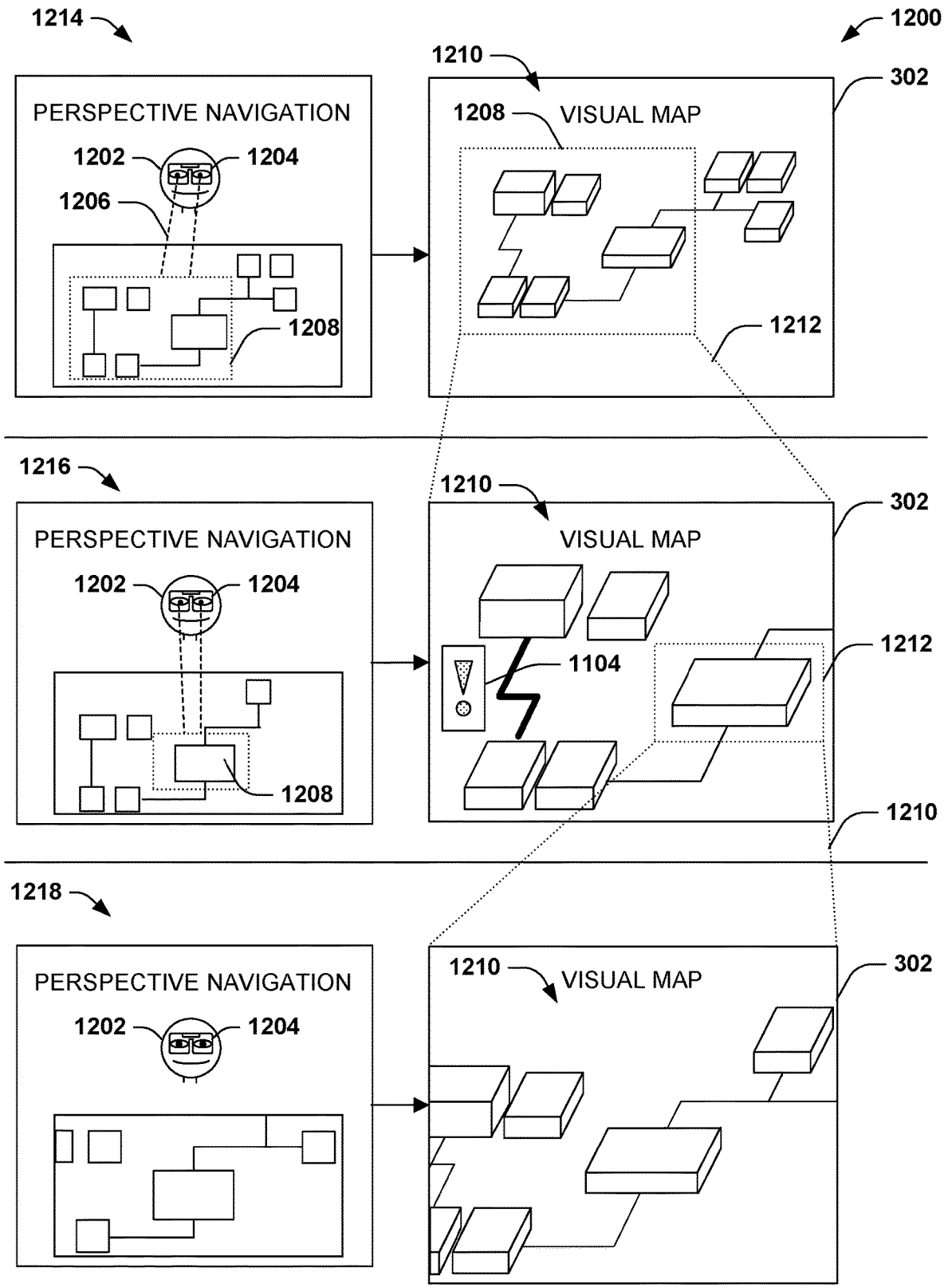
FIG. 12 is an illustration of an example scenario featuring a presentation of the resources of an organization as a visual map that is navigable by a gaze tracking device, in accordance with the techniques presented herein.

FIG. 12 is an illustration of an example scenario 1200 featuring one such technique for enabling navigation within a visual map 302 by a viewer 1202. In this example scenario 1200, the gaze 1206 of the viewer 1202 is tracked by a gaze-tracking device 1204, such as a headset or eyewear that monitors the position of the pupils of the eyes of the viewer 1202 while the viewer 1202 is viewing a display presenting the visual map 302, and extrapolates where within the visual map 302 the gaze 1206 of the viewer 1202 is currently directed. At a first time 1214, when the visual map 302 is presented from a first visual perspective 1210, the gaze-tracking device 1204 may determine that the gaze 1206 of the viewer 1202 is directed at a particular resource 1208, such as a block of resources 104 within the visual map 302. The gaze-tracking device 1204 may interpret the gaze 1206 of the viewer 1202 as a navigation instruction 1212; accordingly, at a second time 1216, the visual map 302 may transition to a second visual perspective 1210 that focuses on the resources 104 indicated by the navigation instruction 1212. The selected perspective 1210 may also annotate the visual map 302 with further information, such as an alert 1104 that pertains to a particular resource or resource interconnection that is viewable at the selected perspective 1210. At the second time 1216, the gaze-tracking device 1204 may further determine that the gaze 1206 of the viewer 1202 is directed at a particular resource 1208, and may generate a navigation instruction 1212 to focus on the selected resource 1208; accordingly, at a third time 1218, the visual map 302 may present a third visual perspective 1210 that focuses on the selected resource 1208. In this manner, the gaze-tracking device 1204 may enable a viewer 1202 to navigation within the visual map 302 of the resources 104. Many such variations may be included in the generation, presentation, appearance, and interactivity of the visual map 302 in accordance with the techniques presented herein.

F. Computing Environment

Figure 13:
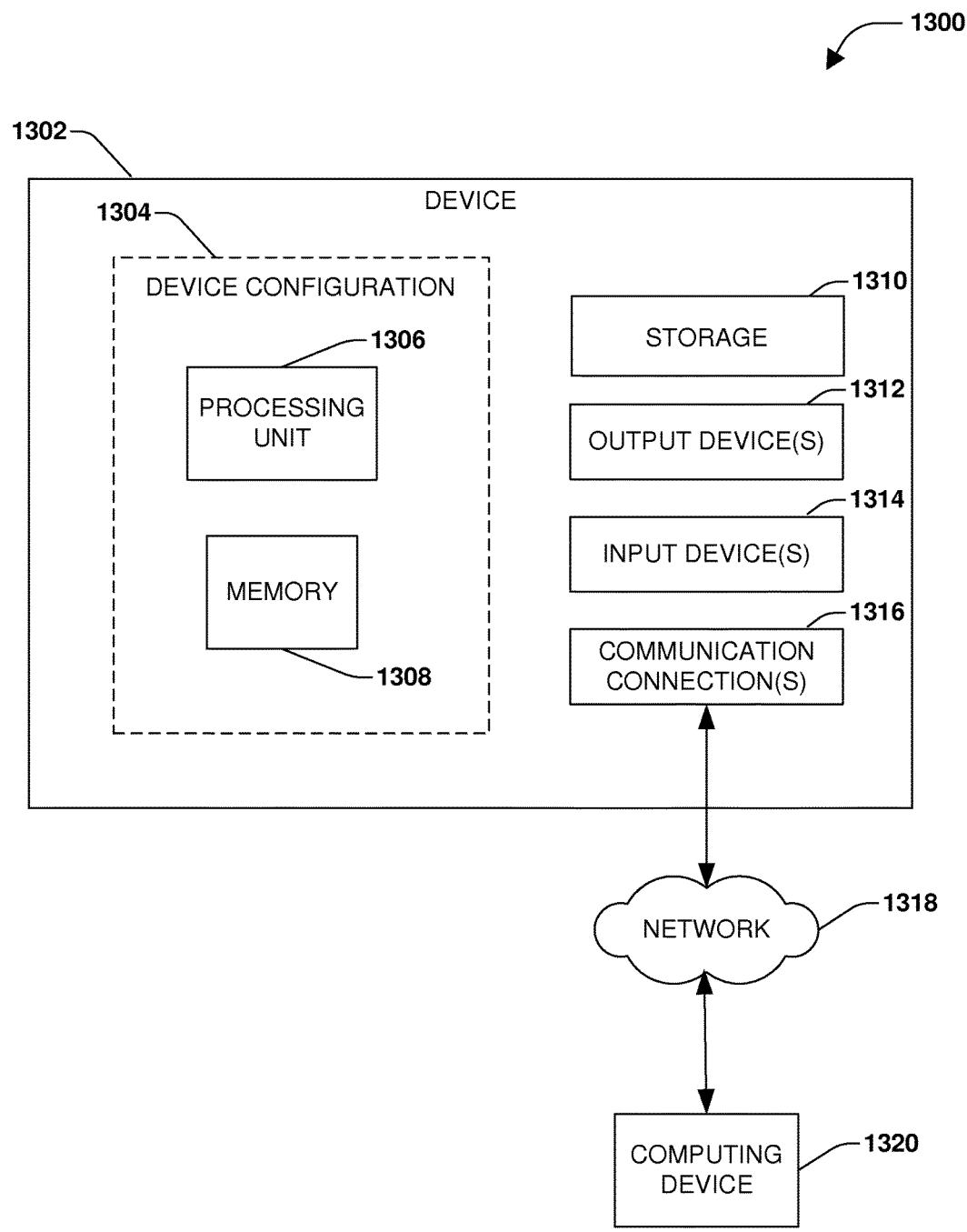
FIG. 13 is an illustration of an example scenario featuring a computing environment within which the techniques presented herein may be implemented and/or utilized.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1300 comprising a computing device 1302 configured to implement one or more embodiments provided herein. In one configuration, computing device 1302 includes at least one processing unit 1306 and memory 1308. Depending on the exact configuration and type of computing device, memory 1308 may be volatile (such as RAM, for example), non-volatile (such as ROM, flash memory, etc., for example) or some combination of the two. This configuration is illustrated in FIG. 13 by dashed line 1304.

In other embodiments, device 1302 may include additional features and/or functionality. For example, device 1302 may also include additional storage (e.g., removable and/or non-removable) including, but not limited to, magnetic storage, optical storage, and the like. Such additional storage is illustrated in FIG. 13 by storage 1310. In one embodiment, computer readable instructions to implement one or more embodiments provided herein may be in storage 1310. Storage 1310 may also store other computer readable instructions to implement an operating system, an application program, and the like. Computer readable instructions may be loaded in memory 1308 for execution by processing unit 1306, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1308 and storage 1310 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1302 may also include communication connection(s) 1316 that allows device 1302 to communicate with other devices. Communication connection(s) 1316 may include, but is not limited to, a modem, a Network Interface Card (NIC), an integrated network interface, a radio frequency transmitter/receiver, an infrared port, a USB connection, or other interfaces for connecting computing device 1302 to other computing devices.

Communication connection(s) 1316 may include a wired connection or a wireless connection. Communication connection(s) 1316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1302 may include input device(s) 1314 such as keyboard, mouse, pen, voice input device, touch input device, infrared cameras, video input devices, and/or any other input device. Output device(s) 1312 such as one or more displays, speakers, printers, and/or any other output device may also be included in device 1302. Input device(s) 1314 and output device(s) 1312 may be connected to device 1302 via a wired connection, wireless connection, or any combination thereof. In one embodiment, an input device or an output device from another computing device may be used as input device(s) 1314 or output device(s) 1312 for computing device 1302.

Components of computing device 1302 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1302 may be interconnected by a network. For example, memory 1308 may be comprised of multiple physical memory units located in different physical locations interconnected by a network.

Those skilled in the art will realize that storage devices utilized to store computer readable instructions may be distributed across a network. For example, a computing device 1320 accessible via network 1318 may store computer readable instructions to implement one or more embodiments provided herein. Computing device 1302 may access computing device 1320 and download a part or all of the computer readable instructions for execution. Alternatively, computing device 1302 may download pieces of the computer readable instructions, as needed, or some instructions may be executed at computing device 1302 and some at computing device 1320.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that presents to a user a visual map of resources of an organization having an organizational structure, the device comprising:
    a processor;
    a display; and
    a memory storing instructions that, when executed on the processor, perform acts comprising:
        monitoring an interaction between respective resources of the organization;
        inferring from the interaction:
            an organizational unit to which each resource is assigned by clustering the resources according to resource properties that include resource type, capability, and resource role, wherein the organizational unit is associated with structure of an organization;
            a relationship between the resources that includes for at least one resource at least one of a data dependency or a functionality dependency with another resource, and
            a usage of each resource associated with the relationship;
        generating an interactive visual map depicting the resources based on said inferring that indicates the resources clustered according to the inferred organizational unit and indicates each relationship by a visual connection, the visual map generated with visual detail that indicates at least one of the resource type, capability, and resource role of each of the resources, and the inferred usage of each resource;
        presenting, on the display, the visual map with the generated visual detail;
        receiving a selection of a select resource of the resources of the organization on the visual map; and
        updating the visual map, on the display, with a description of the usage of the select resource, responsive to the selection.

2. The device of claim 1, wherein:
    the memory further stores an organizational map describing the organizational structure of the organization; and
    inferring the organizational unit to which each resource is assigned further comprises:
        identifying a position of each resource within the organizational map; and
        identifying the organizational unit associated with the position of each resource in the organizational map.

3. The device of claim 1, wherein:
    the device has access to an organizational directory of the organization; and
    inferring the organizational unit to which each resource is assigned further comprises:
        identifying, in the organizational directory, an association between the organizational unit and each resource.

4. The device of claim 1, wherein inferring the organizational unit to which each resource is assigned further comprises:
    identifying, according to the clustering, a proximity of each resource to related resources of the organization.

5. The device of claim 1, wherein inferring the organizational unit to which each resource is assigned further comprises:
    identifying at least one heuristic that matches each resource with an organizational unit of the organization.

6. The device of claim 1, wherein the organizational unit is further divided by one of function, geography, size, or type.

7. A method of presenting, to a user of a device having a processor and a display, resources of an organization having an organizational structure, the method comprising:
    executing, on the processor, instructions that cause the device to perform acts comprising:
        monitoring an interaction between respective resources of the organization;
        inferring from the interaction:
            an organizational unit to which each resource is assigned by clustering the resources according to resource properties that include resource type, capability, and resource role, wherein the organizational unit is associated with structure of an organization;
            a relationship between the resources that includes for at least one resource at least one of a data dependency or a functionality dependency with another resource; and
            usages of the resources associated with the relationship;
        generating an interactive visual map depicting the resources based on said inferring that indicates the resources clustered according to the inferred organizational unit and indicates each relationship by a visual connection, the visual map generated with visual detail that indicates at least one of the resource type, capability, and role of each of the resources, and the inferred usage of the resource;
        presenting, on the display, the visual map with the generated visual detail;
        receiving a selection of a select resource of the resources of the organization on the visual map; and updating the visual map, on the display, with a description of the usage of the select resource, responsive to the selection.

8. The method of claim 7, wherein inferring the relationship between the resources further comprises:
determining that the resource provides data that is consumed by the respective resource.

9. The method of claim 7, wherein inferring the relationship between the resources further comprises:
inferring the relationship according to a network interaction between the resources.

10. The method of claim 7, wherein inferring the relationship between the resources further comprises:
deploying a usage monitoring agent to respective organizational units of the organization, wherein the usage monitoring agent monitors usage of resources by the organizational unit;
receiving, from respective usage monitoring agents, a report of the usage of resources by the organizational unit; and
inferring the relationship between the resources according to reports received from the respective usage monitoring agents.

11. The method of claim 7, wherein inferring the organizational unit to which each resource is assigned further comprises identifying an organizational unit divided by one of function, geography, size, or type.

12. A method, comprising:
executing, on at least one processor, instructions stored in a memory that when executed perform the following acts:
inferring from interaction between computing resources of an organization, the computing resources including a computing resource and a related resource:
an organizational unit to which each computing resource is assigned by clustering the resources according to resource properties that include resource type, capability, and resource role, wherein the organizational unit is associated with structure of an organization;
a relationship between the computing resources that includes for at least one computing resource at least one of a data dependency or a functionality dependency with another computing resource; and
usages of the computing resources associated with the relationship;
generating an interactive visual map of the computing resources of the organization based on said inferring that indicates the computing resources clustered according to the inferred organizational unit and indicates each relationship by a visual connection, the visual map generated with visual detail that indicates at least one of the resource type, capability, and resource role of each of the computing resources, and the inferred usage of each computing resource; and
conveying, for display on a display device, the interactive visual map of the computing resources of the organization with the generated visual detail.

13. The method of claim 12, wherein inferring the organizational unit to which each computing resource is assigned further comprises identifying, in an organizational directory, an association between the organizational unit and the computing resource.

14. The method of claim 12, wherein inferring the relationship between the computing resources further comprises determining that the computing resource provides data that is consumed by the related resource.

15. The method of claim 12, wherein inferring the relationship between the computing resources further comprises inferring the relationship according to a network interaction between the computing resource and the related resource.

16. The method of claim 12, wherein inferring the organizational unit to which each computing resource is assigned further comprises identifying an organizational unit divided by one of function, geography, size, or type.

17. A method of presenting, to a user of a device having a processor and a display, resources of an organization having an organizational structure, the method comprising:
executing, on the processor, instructions that cause the device to perform acts comprising:
monitoring an interaction between respective resources of the organization and inferring from the interaction:
an organizational unit to which the resource is assigned based on an identification of at least one user using the resource, within the organization, wherein the organizational unit is associated with structure of an organization;
a relationship between the resource and a related resource of the organization, wherein inferring the relationship between the resource and the related resource further comprises:
identifying the at least one user within the organization who uses the resource;
identifying the organizational unit of the at least one user of the resource; and
inferring a relationship between the resource and related resources of the organizational unit of the at least one user of the resource; and
at least one usage of the resource associated with the relationship;
presenting, on the display, a visual map of the resources of the organization, wherein the resources are clustered according to the organizational unit and relationships between the resources are represented by visual connections;
receiving a selection of a select resource of the resources of the organization on the visual map; and
updating the visual map, on the display, with a description of the usage of the select resource, responsive to the selection.

18. A method, comprising:
executing, on at least one processor, instructions stored in a memory that when executed perform the following acts:
inferring from interaction between computing resources of an organization:
an organizational unit to which a computing resource is assigned, based on an identification of at least one user using the resource, within the organization, wherein the organizational unit is associated with structure of an organization;
a relationship between the computing resource and a related resource of the organization, wherein inferring the relationship between the computing resource and the related resource further comprises:
identifying the at least one user within the organization who uses the computing resource;
identifying the organizational unit of the at least one user of the computing resource; and
inferring a relationship between the resource and related resources of the organizational unit of the at least one user of the computing resource; and at least one usage of the computing resources associated with the relationship;

generating an interactive visual map of the computing resources of the organization, wherein the computing resources are clustered according to the organizational unit, relationships between resources are represented by visual connections; and conveying, for display on a display device, the interactive visual map of the computing resources of the organization.

* * * * *